United States Patent
Ruzzier et al.

(10) Patent No.: US 8,380,030 B2
(45) Date of Patent: Feb. 19, 2013

(54) BEND-INSENSITIVE OPTICAL CABLE (75) Inventors: Marco Ruzzier, Milan (IT); Francesco Sartori, Milan (IT); Enrico Consonni, Milan (IT); Daniele Cuomo, Cava De' Tirreni (IT)

(73) Assignee: Prysmian S.p.A., Milan (IT)

( * ) Notice: Subject to any disclaimer, the term of this patent is extended or adjusted under 35 U.S.C. 154(b) by 107 days.

(21) Appl. No.: 13/127,458

(22) PCT Filed: Nov. 7, 2008

(86) PCT No.: PCT/EP2008/065174
§ 371 (c)(1),
(2), (4) Date: May 3, 2011

(87) PCT Pub. No.: WO2010/051856
PCT Pub. Date: May 14, 2010

(65) Prior Publication Data
US 2011/0211794 A1 Sep. 1, 2011

(51) Int. Cl.
G02B 6/44 (2006.01)

(52) U.S. Cl. ........ 385/111; 385/100; 385/101; 385/102; 385/103; 385/104; 385/105; 385/106; 385/107; 385/108; 385/109; 385/110; 385/112; 385/113; 385/114

(58) Field of Classification Search ........... 385/100–114
See application file for complete search history.

(56) References Cited

U.S. PATENT DOCUMENTS

| 5,590,233 | A | 12/1996 | Carratt et al. |
| 6,477,297 | B1 | 11/2002 | DeMeritt et al. |
| 2004/0213531 | A1 | 10/2004 | Sasaoka |

(Continued)

FOREIGN PATENT DOCUMENTS

| EP | 1 329 750 A2 | 7/2003 |
| EP | 1 845 399 A1 | 10/2007 |

(Continued)

OTHER PUBLICATIONS

International Search Report from the European Patent Office for International Application No. PCT/EP2008/065174 (Mail date Jul. 9, 2009).

(Continued)

*Primary Examiner* — Brian Healy
*Assistant Examiner* — Guy Anderson
(74) *Attorney, Agent, or Firm* — Finnegan, Henderson, Farabow, Garrett & Dunner, L.L.P.

(57) ABSTRACT

A bend-insensitive optical cable for transmitting optical signals includes an optical cable having a length, extending from an input end adapted to receive the optical signals, to an output end and including at least one single-mode optical fiber having a cable cut-off wavelength, of 1290 nm to 1650 nm. The at least one optical fiber is helically twisted around a longitudinal axis with a twisting pitch, for a twisted length, extending along at least a portion of the length, of the optical cable, wherein the twisted length and the twisting pitch are selected such that the optical cable exhibits a measured cut-off wavelength equal to or lower than 1260 nm. Preferably, the at least one fiber has a mode-field diameter of 8.6 μm to 9.5 μm. According to a preferred embodiment, the optical cable includes two optical fibers twisted together along the longitudinal axis, each of the two optical fibers having a cable cut-off wavelength of 1290 nm to 1650 nm.

19 Claims, 6 Drawing Sheets

U.S. PATENT DOCUMENTS

| | | |
|---|---|---|
| 2007/0077016 A1 | 4/2007 | Bickham et al. |
| 2007/0280615 A1 | 12/2007 | de Montmorillon et al. |
| 2010/0290781 A1* | 11/2010 | Overton et al. ............ 398/43 |

FOREIGN PATENT DOCUMENTS

| | | |
|---|---|---|
| JP | 2004-198523 | 7/2004 |
| WO | WO-01/27667 A2 | 4/2001 |

OTHER PUBLICATIONS

Kitayama, et al., "Length Dependence of Cutoff Wavelength for Single-Mode Fiber", Electronics and Communications in Japan, Part 1, vol. 68, No. 7, pp. 104-113, (1985).

Unger, et al., "Characterization of the bending sensitivity of fibers by the MAC-value", Optics Communications 107, pp. 361-364, (May 1, 1994).

Wang, et al., "Theoretical and experimental investigations of macro-bend Losses for standard single mode fibers", Applied Optoelectronics Center, Dublin Institute of Technology, OPTICS EXPRESS 4476, vol. 13, No. 12, pp. 1-9, (Jun. 13, 2005).

IEC, International Standard, "Optical fibres—Part 1-44: Measurement methods and test procedures—Cut-off wavelength", 60793-1-44, First Edition, pp. i-ii and 1-44, (Jul. 2001).

IEC, International Standard, "Optical fibres—Part 1-45: Measurement methods and test procedures—Mode field diameter", 60793-1-45, First Edition, pp. i-ii and 1-60, (Jul. 2001).

* cited by examiner

BEND-INSENSITIVE OPTICAL CABLE

CROSS REFERENCE TO RELATED APPLICATIONS

This application is a national phase application based on PCT/EP2008/065174, filed Nov. 7, 2008, the content of all of which is incorporated herein by reference.

BACKGROUND OF THE INVENTION

1. Field of the Invention

The present invention relates to an optical cable for telecommunication, in particular to an optical cable comprising at least one single-mode optical fiber.

2. Description of the Related Art

The use of single-mode optical fibers in fiber-to-the-premises (FTTP) applications, including fiber-to-the-home (FTTH) and fiber-to-the-building (FTTB) applications, generally require low bending loss of optical signals transmitted through the fibers, also under stringent installation constraints that may impose tight bend radii, e.g., due to sharp cornering in buildings or compression of optical fibers. In particular, cabling and hardware applications aimed to miniaturize passive field equipment, e.g., local convergence cabinets or storage boxes, and the development of multi-dwelling units (MDUs) require fiber designs with superior bending capabilities. In addition, coarse wavelength division multiplexing systems (CWDM) and passive optical network (PON) systems may also need employment of bend-insensitive optical fibers.

In order to standardize the bending performance of optical fibers particularly suited for FTTP applications, the ITU-T (International Telecommunications Union, ITU Telecommunication Sector) has recently developed recommendation G.657 that defines single-mode fibers with enhanced bending performance.

To conform to international standards, besides bending capabilities, fiber performance is evaluated also on other relevant optical parameters such as the cut-off wavelength and the mode field diameter (MFD). A parameter that can be useful for finding a compromise between the MFD, the cut-off wavelength and bending losses is the so-called MAC number, which is the ratio of the MFD and the cut-off wavelength.

It has been observed that in order to obtain low bending losses, the MAC number should be reduced.

In *Characterization of the bending sensitivity of fibers by the MAC value*, by C. Unger and W. Stocklein, published in Optics Communications, vol. 107 (1994), pages 361-364, macro- and micro-bending performance of matched-cladding fibers and correlation with the MAC number are investigated. The articles states that the bending behavior of step-index fibers is completely characterized by the MAC number and that macro- and micro-bending losses increase with increasing of MAC number.

WO patent application No. 01/27667 discloses a single-mode fiber operating in wavelengths between 1300 nm and 1700 nm and having reduced bending losses, the fiber comprising a MAC number not more than 7.8. Preferred fibers are said to have an MFD of 8.6 μm or less at a wavelength of 1310 nm and a cabled cut-off wavelength which is at most about 1330 nm.

US patent application No. 2007/0077016 describes an optical fiber having low bending losses in which the refractive index profile is selected to provide a MAC number of not more than 7.0, a zero dispersion wavelength of less than 1450 nm, and a 20-mm diameter bending loss at 1550 nm of not more than 5.0 dB/m. Micro-bend performance are said to be improved by a certain combination of primary and secondary coating. The primary coating has a Young's modulus of less than 1.0 MPa and a glass transition temperature of less than −25° C. and the secondary coating, which contacts and surrounds the primary coating, has a Young's modulus of greater than 1200 MPa.

Designs of optical fibers with depressed refractive-index regions, which are tailored to a reduction of bending losses, have been developed. For example, US patent application No. 2007/0280615 describes an optical fiber design usable in FTTH and FTTC (fiber-to-the-curb) transmission systems. The fiber structure comprises a central core, a first intermediate cladding, a first depressed cladding, a second intermediate cladding and a second depressed cladding. The described fiber may have MAC ratios up to about 8.2.

Y. Kitayama and S. Tanaka show in *Length dependence of effective cutoff wavelength for single-mode fiber*, published in Electronics and Communications in Japan, Vol. 68, No. 7, (1985), pages 104-113, that the effective cut-off wavelength of reel-wound fibers shifts to lower wavelengths along the distance. The article describes experiments of effective cut-off wavelengths measured for different reel radius performed on a 6-fiber cable where the fibers are wound around a central member with pitch of 200 mm (equivalent to a bend radius of 1084 mm) and length of 1 km.

JP patent application No. 2004198523 discloses an optical fiber module used in a Raman amplifier. In the module, the effective cut-off wavelength is shortened by winding an optical fiber for Raman amplification in a coiled form.

U.S. Pat. No. 5,590,233 concerns a cable for use in a distribution network, which comprises a plurality of optical fibers, each fiber being provided with a substantially hermetic coating and including over said hermetic coating a coating of plastics material, the cable further including an outer protective sheath of plastics material surrounding said optical fibers, wherein each of said optical fibers has a mode field diameter lying in the range of 7 μm to 9 μm at around 1550 nm, and a cutoff wavelength that is less than or equal to 1350 nm. To improve the mechanical quality of the cable, the optical fibers can be conventionally twisted along the length of the cable.

Q. Wang et al. in *Theoretical and Experimental Investigations of Macro-bend Losses for standard single mode fibers*, published in Optics Express Vol. 13, 13 Jun. 2005, pages 4476-4484, presents theoretical and experimental investigations of macro-bend losses for standard fibers SMF28 showing that the inner primary coating layer has an impact on the bending losses.

U.S. Pat. No. 6,477,297 describes a method for assembling a plurality of optical fibers for forming fiber pigtailed component aimed to a reduction of the optical impact on macrobending. Although the nominal cut-off wavelength of SMF-28 used for pigtails is approximately 1280 nm, for a batch of fibers, the actual cut-off wavelength is distributed across a Gaussian distribution. The disclosed method comprises the steps of: selecting, from a plurality of optical fibers characterized by a common nominal cut-off wavelength and an actual cut-off wavelength such that the actual cut-off wavelength of each one of this plurality of fibers is the same as the nominal cut-off wavelength or differs slightly from the nominal cut-off wavelength due to manufacturing tolerances; only fibers with actual cut-off wavelength larger than $\lambda_{min}$, where $\lambda_{min}$ is a predetermined minimum acceptable cut-off wavelength of the selected fibers; and bending at least one section of at least one of these selected fibers such that this bent section has a bend radius R, where 12 mm<R<18 mm.

SUMMARY OF THE INVENTION

The Applicant has observed that design of fibers with depressed-core or trench-assisted structures and tailored to a reduction of bending losses may increase the complexity of the preform manufacturing and thus the cost of the finished product.

The Applicant has noted that a reduction of MAC, by reducing the MFD and/or by increasing the effective cut-off wavelength may produce an optical fiber departing from the ITU-T standards, thereby making the fiber incompatible with certain transmission optical systems or access distribution networks.

The present invention tackles the problem of accomplishing an optical cable with enhanced bending performances while exhibiting optical parameters that comply with the mostly common international standards, in particular those related to the FTTP applications.

The present invention aims to provide a bend-insensitive optical cable, which can withstand tight corner bends and which, at the same time, exhibits single-mode transmission in the O-band (1260-1360 nm) wavelength range.

Furthermore, the present invention aims to provide a bend-insensitive optical cable exhibiting single-mode transmission while allowing ease of operation and relatively small insertion loss, e.g., less than 0.1 dB, in fusion and/or mechanical splicing of the optical cable.

The Applicant found that it is possible to obtain a bend insensitive optical cable, complying with the standards for transmission or FTTP applications, by selecting at least one fiber having per se an optical parameter non compliant with the standard, namely the "fiber MAC number", and arranging the fiber within the cable by imparting a curvature to at least one longitudinal portion of said fiber. In particular, by applying an appropriate curvature to the fiber, the effective fiber cut-off wavelength decreases and thus the resulting cut-off wavelength measured in the optical cable satisfies the desired optical performances for single-mode transmission at wavelengths equal to or higher than 1260 nm.

Advantageously, in the present invention, the optical fiber is selected to have an MFD of at least 8.6 μm, for example up to 9.5 μm, preferably of from 8.6 μm to 9.0 μm.

According to an aspect, the invention is directed to an optical cable having a cable length $L_{TOT}$ extending from an input end to an output end and comprising at least one single-mode optical fiber having a cable cut-off wavelength, $(\lambda_{cc})_A$, of from 1290 nm to 1650 nm, wherein said at least one optical fiber is helically twisted around a longitudinal direction for a twisted length L with a twisting pitch P, the values of L and P being selected such that the optical cable exhibit substantial single-mode transmission, and wherein said twisted length L extends along at least a portion of said cable length $L_{TOT}$. In particular, the twisted length L and the twisted pitch P are selected in such a way that the measured cut-off wavelength in the optical cable is equal to or lower than 1260 nm.

Preferably, the cable cut-off wavelength, $(\lambda_{cc})_A$, of the at least one optical fiber is of from 1320 nm to 1650 nm, more preferably of from 1450 nm to 1650 nm.

In some embodiments, the twisting pitch P is selected in the range from 10 mm to 30 mm.

Preferably, the twisted length L of the optical cable is selected by taking into account the value of the twisting pitch P.

In some embodiments, the twisted length L is of at least 2 meters.

In some embodiments, the twisted L is not more than 2 km.

Preferably, the twisted length L is approximately equal to the cable length, $L_{TOT}$.

According to a preferred embodiment, the optical cable comprises two optical fibers twisted together along the longitudinal direction for a given twisted length L, each of the two optical fibers having a value of $(\lambda_{cc})_A$ of from 1290 nm to 1650 nm.

According to another preferred embodiment, the optical cable comprises an optical fiber twisted around a central element extending along the longitudinal direction.

Preferably, the at least one optical fiber comprised in the optical cable is of match-clad type.

The optical cable according to the invention can be advantageously used as drop cable in a fiber access distribution network.

According to an aspect, the invention relates to a distribution optical cable for an access distribution network, the distribution cable including a bundle of optical drop cables, wherein at least one optical drop cable of the bundle comprises at least one single-mode optical fiber having a cable cut-off wavelength, $(\lambda_{cc})_A$, of from 1290 nm to 1650 nm, and wherein said at least one optical fiber is helically twisted around a longitudinal direction for a twisted length L with a twisting pitch P, the values of L and P being selected such that the optical drop cable exhibits substantial single-mode transmission, namely the measured cut-off wavelength of the drop cable is equal to or lower than 1260 nm. Preferably, each optical drop cable of the bundle of the distribution cable comprises at least one twisted optical fiber.

According to another aspect, the invention relates to an access distribution network comprising a distribution optical cable comprising a bundle of distribution optical fibers, wherein at least one of the distribution optical fibers of the bundle is extracted from the distribution cable and routed away from it to a fiber splicing area that comprises a splicing tray for joining a downstream portion of the at least one distribution optical fiber of the distribution cable and an upstream portion of at least one optical fiber comprised in an optical drop cable, wherein the at least one optical fiber of the drop cable is helically twisted around a longitudinal direction for a twisted length L with a twisting pitch P, the values of L and P being selected such that the measured cut-off wavelength, i.e., measured in the optical cable, is equal to or lower than 1260 nm.

BRIEF DESCRIPTION OF THE DRAWINGS

The present invention will be now described more fully hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

DEFINITIONS

Cut-off wavelength of a single-mode fiber is the wavelength above which the fiber propagates only the fundamental mode. Below cut-off the fiber will transmit more than one mode.

Measured cut-off wavelength is defined according to IEC-60793-1-44 standard as the wavelength greater than the one at which the ratio between the total power, including launched higher-order modes, and the fundamental mode power has decreased to less than 0.1 dB. According to this definition, the second-order mode ($LP_{11}$) undergoes 19.3 dB more attenuation than the fundamental mode ($LP_{01}$). Herein, given an optical cable of cable length $L_{TOT}$, the measured cut-off wavelength is generally referred to the cut-off wavelength measured according to the IEC-60793-1-44 standard definition in the cable length, $L_{TOT}$, when the cable is substantially linearly deployed.

Cable cut-off wavelength of an optical fiber $(\lambda_{cc})_A$ is the cut-off wavelength value measured according to the cut-off test Method A described in the IEC-60793-1-44 standards. Namely, the method A prescribes to perform the measurement on a 22 m of uncabled fiber span, where the central 20 m portion of the fiber is wound on a 280 mm-diameter mandrel and one turn of each of the two 1 m-long end portions is wound on a 80 mm-diameter mandrel.

Cable cut-off wavelength of an optical cable $(\lambda_{cc})_B$ is the cut-off wavelength value measured according to the cut-off test Method B described in the IEC-60793-1-44 standards. The measurement is performed on a 22 m-long optical cable, where the central 20 m portion of the cable is linearly deployed and the fiber is exposed for two 1 m-long end portions, which are wound on a 80 mm-diameter mandrel.

The mode field diameter (MFD) of an optical fiber is measured according to the IEC 60793-1-45 standard, at a wavelength of 1310 nm.

MAC number is defined as the ratio between mode field diameter (MFD) measured at 1310 nm, in microns, and the cable cut-off wavelength $(\lambda_{cc})_A$, in microns.

Macrobending loss (in dB), when not otherwise defined, is the attenuation increase at 1625 nm measured in a fiber wound for one turn on a 15-mm diameter mandrel.

Match-clad optical fibers are fibers whose refractive index profile has substantially no regions with index significantly lower than that of pure silica, at the wavelengths used in single-mode transmission (1260-1625 nm). Typically, a match-clad optical fiber is substantially free from index-decreasing dopants in the core. An example of match-clad optical fiber is a step-index optical fiber comprising a Ge-doped core and a pure-silica cladding.

In the present description and claims, the term "drop cable" is used to refer to an optical cable operating as the last link of an access distribution network, typically serving just one subscriber.

DETAILED DESCRIPTION

Bend-insensitive optical cables comprising single-mode optical fibers are often tailored to FTTP applications, where they are provided in houses, offices, and other premises for telecommunication services, such as broadband Internet, video-on-demand and high-definition IPTV.

Figure 1:
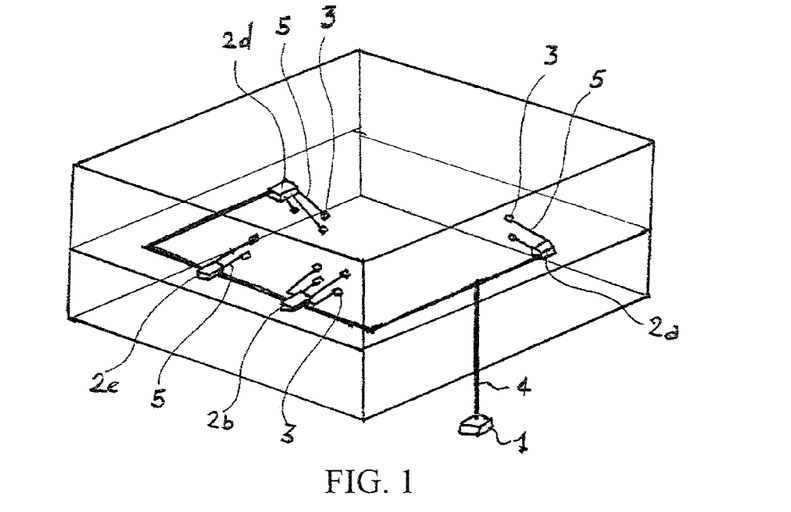
FIG. 1 is an illustrative example of a possible deployment of a fiber access distribution network.

An illustrative representation of a fiber access distribution network in a building is shown in FIG. 1. A distribution cable 4, which may comprise a relatively large number of fibers, e.g., up to 90 fibers, is routed from a multi-dwelling unit (MDU) 1, placed in the building basement, up to each floor and around the peripheral wall of the building or under a floating floor (in the figure, only one floor is shown). From a plurality of intermediate transition boxes (ITBs) 2a-2d the distribution cable 4 can splice up to four drop cables 5. Each drop cable 5, typically serving individual residences or, such as in the illustrated example, different areas in a large open-space location, reaches a respective access termination box (ATB) 3 for the termination of up to two fibers to an individual subscriber. Each ATB 3 can be completed with an optical/electrical converter. The number of drop cables 5 spliced from the distribution cable at each ITB is purely exemplary. For instance, some or each ITB can enable the distribution cable to be spliced up to twelve drop cables. Possibly, more than one drop cable 5 is connected to an ATB 3.

Although the example of FIG. 1 shows an access distribution on a single floor, it is to be understood that a distribution network may be generally installed in a multi-story building in order to bring optical fibers to individual subscribers on different floors. For example, in a multi-store building, a distribution network may comprise a MDU placed on the building's basement from which a riser cable traverse the vertical rise of the building and segments of the cable are dropped at each floor. Alternatively, the distribution cable can be routed from an optical network unit and is spliced up at a plenum cable entrance facility in a plurality of drop cables that then reach different houses of individual subscribers.

Installation routes of drop cables often include tight corners and edges, such as in case when the cable runs around a doorframe or around a sharp corner within an apartment.

Macrobending losses have a general tendency to decrease with decreasing of the MAC number of the optical fiber. The MAC number of an optical fiber is defined by the following relation:

$$MAC = \frac{MFD}{(\lambda_{cc})_A} \quad (1)$$

where MFD is the mode field diameter at 1310 nm, measured in microns, and $(\lambda_{cc})_A$ is the cable cut-off wavelength of the fiber, always in micron.

Figure 2:
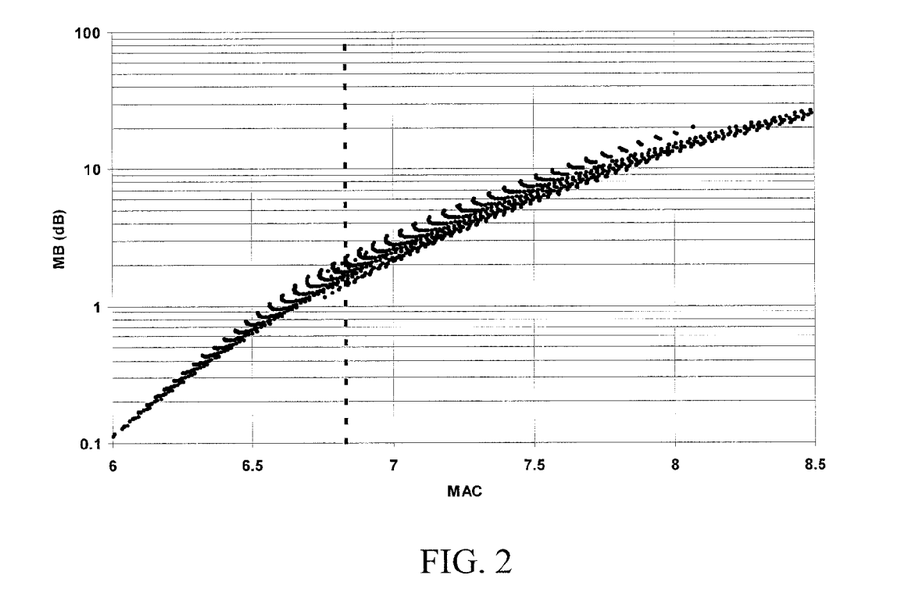
FIG. 2 is a plot reporting numerical simulations of macrobending loss (MB) vs. MAC value for single-mode step-index optical fibers.

FIG. 2 reports results on numerical simulations of the macrobending loss, represented with black dots, as a function of the MAC number for single-mode step-index optical fibers of standard type, in which the fiber core is made of silica-based material doped with a doping element that increases the refractive index, such as germanium and the cladding is made of pure (undoped) silica. The plot reports MAC value in abscissa and macrobending loss (MB), in dB, in ordinate. It can be observed that, although the relationship between macrobending losses and MAC numbers is not perfectly univocal, there exists a general reduction of macrobending loss along with decreasing the MAC number.

A low MAC value can be achieved either by lowering the MFD or by increasing the $(\lambda_{cc})_A$, or by acting on both optical parameters. However, to conform to international standards, besides bending capabilities, the optical fiber needs to possess several relevant optical parameters, such as the cable cut-off wavelength and the MFD, within a prescribed range of values. For instance, ITU-T Recommendations G. 652 (optical fibers for standard transmission) recommends an MFD at 1310 nm of at least 8.6 µm and the cable cut-off wavelength of the optical fiber, always according to G. 652, should be not larger than 1260 nm, i.e., well below a typical operational wavelength of 1310 nm.

These constraints imply that, in principle, the MAC number should be equal to or higher than 6.83, if compliance with the principal optical fiber standards is to be preserved. In FIG. 2, the vertical dashed line indicates the MAC number of 6.83. Therefore, results show that macrobending performance of a step-index optical fiber is relatively limited, as macrobending loss corresponding to a MAC number of 6.8 cannot be much smaller than 2 dB. Such values may not be sufficiently small to suit installations of the fiber in access distribution networks.

The Applicant has observed that an optical fiber, especially if tailored to FTTP applications, should advantageously exhibit an MFD value sufficiently large to support ease of operation and limited insertion loss in fusion and mechanical splicing.

Figure 3:
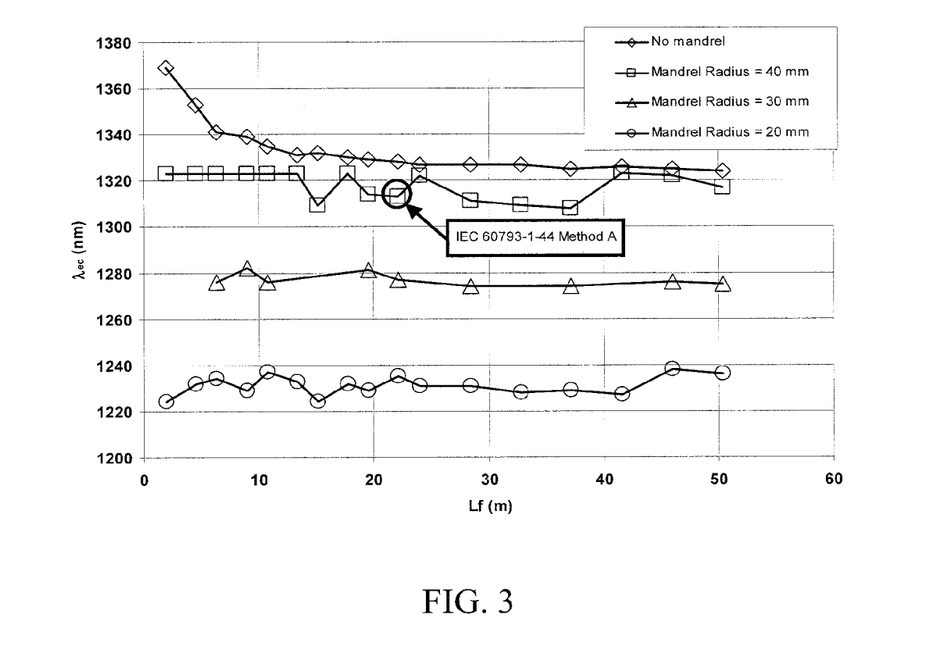
FIG. 3 is a plot showing experimental measurements of the effective cut-off wavelength, $\lambda_{ec}$, of a step-index optical fiber having cable cut-off wavelength, $(\lambda_{cc})_A$, of 1320 nm and MFD of 8.66 μm.

Coiling an optical fiber characterized by a given cut-off wavelength may shift the cut-off wavelength to smaller values. FIG. 3 is a plot showing experimental measurements of the effective cut-off wavelength, $\lambda_{ec}$, (in nm) of a match-clad optical fiber having cable cut-off wavelength, $(\lambda_{cc})_A$, of 1320 nm, MFD of 8.66 µm and thus a MAC number of 6.56. It is noted that the optical fiber considered in the experiment has a value of $(\lambda_{cc})_A$ larger than that recommended in common ITU-T standards for single-mode transmission. In FIG. 3, the effective cut-off wavelength (in ordinate, in nm) is plotted as a function of the fiber span length, $L_f$ (in abscissa, in meters), for the unwound optical fiber (diamonds) and the optical fiber with a central portion of the fiber length wound on a 280 mm-diameter mandrel and one turn of each of the two 1 m-long lateral portions of the fiber length being wound on a 40 mm-radius mandrel (squares), a 30 mm-radius mandrel (triangles) and on a 20 mm-radius mandrel (circles). The plot of FIG. 3 indicates with an arrow the measurement for 22 m of fiber span length (signposted by the circle), where the lateral portions are wound on a 40 mm-radius mandrel, because such a measurement corresponds to that prescribed by the IEC-60793-1-44 standards (method A), for the determination of the cable cut-off wavelength of the optical fiber.

Results of FIG. 3 show that winding of the fiber with curvature radius, i.e., the mandrel radius, of less than 40 mm leads to a decrease of the effective cut-off wavelength. Remarkably, winding the 1 m-long lateral portions of the optical fiber on a mandrel with 20 mm-radius makes the effective cut-off wavelength to take values of about 1230 nm, almost irrespectively of the length of the fiber span, $L_f$ at least within the considered range, thus allowing single-mode transmission in the O-band wavelength region, i.e., from 1260 nm to 1360 nm.

The Applicant has understood that by selecting an optical fiber with cable cut-off wavelength outside the range of values that permit single mode transmission, and in particular above the uppermost value prescribed by most common transmission standards, it is possible to obtain an optical cable with single-mode optical performance by imparting a curvature with a proper radius of curvature to at least a length portion of the optical fiber comprised in the cable.

Advantageously, the optical fiber can be selected to have an MFD value of at least 8.6 µm, thus the fiber can be tailored to allow relatively low splice losses. For example, the MFD is up to 9.5 µm. Preferably, in order to further enhance bending performance of the cable, the MFD value is of from 8.6 to 9.0 µm.

Figure 4:
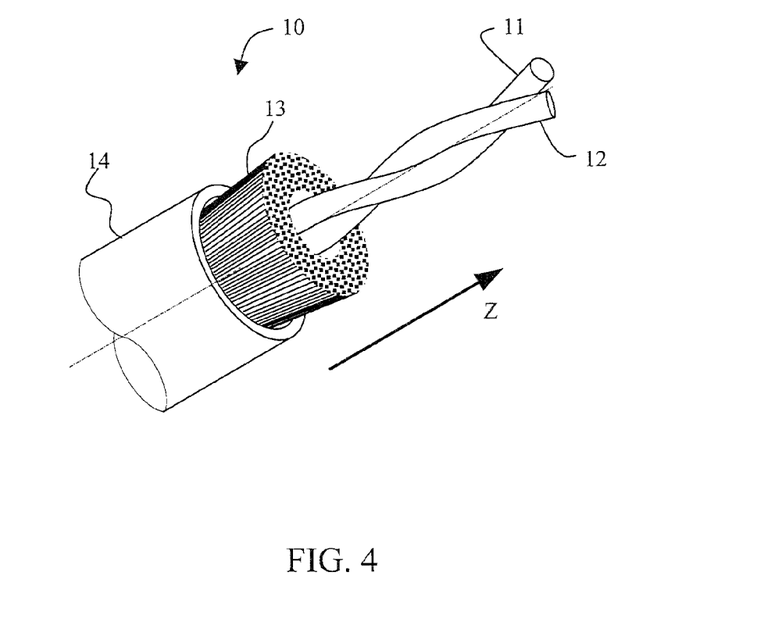
FIG. 4 is a schematic perspective view of an optical cable according to an embodiment of the present invention.

FIG. 4 is a schematic perspective view of an optical cable according to an embodiment of the present invention. The optical cable 10, which can be a drop cable of an access distribution network, comprises two optical fibers 11 and 12 helically twisted around each other along a longitudinal axis Z (i.e., the helical axis), which is in general substantially parallel to the cable longitudinal direction. Each fiber 11 and 12 is a single-mode optical fiber with cable cut-off wavelength, $(\lambda_{cc})_A$, equal to or higher than 1290 nm, preferably of from 1320 nm to 1650 nm. The optical cable 10 extends for a total length, $L_{TOT}$, from an input end adapted to receive the optical signals to be transmitted to an output end. The input and output ends are not shown in the figure, which represents only a portion of the cable in order to illustrate the cable construction. The optical fibers 11 and 12 are twisted for a twisted length, L, with a twisting pitch P, which corresponds to a radius of curvature, p.

Preferably, each fiber 11 and 12 of the twisted fiber pair has an MFD of from 8.6 µm to 9.0 µm. In an embodiment, fibers 11 and 12 are made of silica-based materials and comprise a core surrounded by a cladding. Preferably, the optical fibers are of match-clad type. Preferably, the core of each fiber is made of silica doped with a doping element that increases the refractive index, such as germanium, and the cladding is made of pure (undoped) silica.

According to a preferred embodiment, the fibers 11 and 12 of optical cable 10 are "tight-buffered". The silica optical fiber, with typical nominal diameter of 125 µm, is coated by a primary coating, which is surrounded by a secondary coating, which typically contacts the primary coating, the primary and secondary coating forming a coating system. For example, the coating system is made of two different UV-cured acrylate material up to a diameter of 250 μm. A buffer layer is provided to surround the coating system in a tight manner, i.e., substantially homogeneously adhering to the fiber coating system. Advantageously, the buffer layer is made of a thermoplastic material, preferably an LSOH (Low-Smoke Zero Halogen) material. The buffer layer is typically extruded over the 250 μm-coated fiber, increasing the outside diameter up to 600-1000 μm, with typical values of 800-900 μm.

According to another embodiment, the optical fibers of the optical cable are coated only by a coating system and have an outside diameter of about 250 μm.

The optical cable of FIG. 4 illustrates a loose-tube buffer construction, in which the twisted fibers are inserted in a longitudinally extending tubular jacket 14, made of a polymeric material, for instance of a thermoplastic material. Within the jacket 14, the twisted fibers are surrounded by strengthening members 13, such as aramid yarns. For example, the fibers have an outside diameter of 900 μm and the jacket 14 has an inner diameter of 2-3 mm and an outer diameter of 4-5 mm.

One way of producing the optical cable represented in FIG. 4 is by selecting a given span length of two tight-buffered optical fibers having $(\lambda_{cc})_A$>1290 nm, and preferably up to 1650 nm. The span length of each fiber can be for instance of 15-20 m, which can be typical for producing a cable for indoor FTTP applications, such as a drop cable.

For example, a cable comprising two optical fibers according to the invention was produced as follows. Two 900 μm buffered optical fibers were loaded on a pair-twisting and stranding module, commonly used for the production of copper stranded pair cables. Said module comprised a double pay-off, a bow for twisted pair formation, and a rotating drum take-up. The combined twisting of pay-off and take-up determined a twisting pitch of about 20 mm. By means of the described apparatus, a total length of about 600 m twisted pair was manufactured. A protective jacket can be extruded over the twisted fibers by means of an extruder in a manner per se known.

Twisting the optical fibers around each other imparts a curvature to both fibers, which is characterized by a radius of curvature, ρ, given by the following relation $$\rho = \frac{P^2}{(2\pi)^2 R} + R \qquad (2)$$

where P is the twisting pitch and R is the fiber radius. The twisting pitch P is the distance along the helical axis (i.e., Z axis in FIG. 4) to get a full rotation of the optical fiber.

The length of the optical fiber within each single pitch, $L_p$, is given by $$L_p = \sqrt{P^2 + (2\pi R)^2} = 2\pi\sqrt{\rho R} \qquad (3)$$

Figure 5:
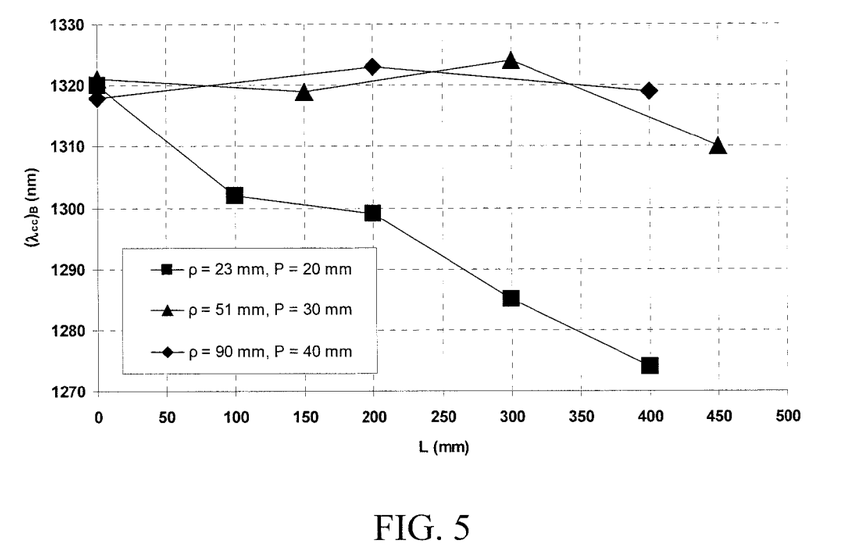
FIG. 5 is plot showing experimental measurements of the cable cut-off wavelength of an optical cable, $(\lambda_{cc})_B$, comprising two tight-buffered optical fibers of outside diameter of 900 μm twisted around each other, as a function of the twisted length, L (in mm).

FIG. 5 reports experimental measurements of the cable cut-off wavelength of the optical cable, $(\lambda_{cc})_B$, for an optical cable of the type shown in FIG. 4, which is measured by taking a 22 m-long span length of optical cable ($L_{TOT}$=22 m), whose central 20 m portion is left substantially uncoiled, by extracting the two 1 m-long terminal portions of cable, and by inserting a 40 mm-diameter loop for each terminal portion (experimental conditions corresponding to those prescribed in the IEC-60793-1-44 standards, method B). The plot of FIG. 5 shows, in ordinate, the cable cut-off wavelength (in nm) of the cable $(\lambda_{cc})_B$, and the length of the optical cable along which the optical fibers are twisted, in the following referred to as the twisted length, L, (in mm) in abscissa. The cable comprises two buffered optical fibers of outside diameter of 900 μm (R=0.45 mm) twisted together. Each optical fiber has a cable cut-off wavelength, $(\lambda_{cc})_A$, of about 1320 nm and MFD of 8.6 μm. The cable cut-off wavelength of the optical cable is plotted as a function of the twisted length, L, for three different twisting pitches, of 20 mm (squares), 30 mm (triangles) and 40 mm (diamonds), corresponding to radii of curvature, ρ, of 23 mm, 51 mm and 90 mm, respectively. It is to be understood that $L=N\times L_p$, where N is the number of pitches and $L_p$, is given by Eq. (3). The twisted length, L, is smaller than the length portion of the fiber(s) utilized in the twisting by a factor equal to $\sqrt{1-R/\rho}$.

Experimental results show a pronounced decrease of the values of $(\lambda_{cc})_B$ with increase of the twisted length, L, especially for ρ=23 mm, which corresponds to a twisting pitch P=20 mm. For ρ=51 mm (P=30 mm), a significant decrease of $(\lambda_{cc})_B$ is observed for L=450 mm.

Results show that twisting a sufficiently long fiber portion with a sufficiently short twisting pitch (or sufficiently small radius of curvature), so as to reduce the cable cut-off wavelength of the optical cable, can produce a low-macrobending loss optical cable suitable for single-mode transmission.

It is noted that the values of $(\lambda_{cc})_A$ and $(\lambda_{cc})_B$ determined according to the foregoing definitions are expected to be substantially equal to each other, were the fiber(s) untwisted.

According to the invention, the twisted length and the twisting pitch are selected such that the optical cable exhibits a measured cut-off wavelength (namely, measured in the length of the optical cable as previously described) equal to or lower than 1260 nm. In this way, for a cable having a total length $L_{TOT}$, which extends from an input end apt to receive optical signals to an output end, single-mode optical signals emerge at the output end of the optical cable.

For a given twisting pitch, the twisted length L of the optical cable should be sufficiently long to cause the higher-order modes to fade away and to obtain an optical cable of total length $L_{TOT}$ of single-mode transmission. Preferably, the twisted length, L, approximately corresponds to the whole cable length, $L_{TOT}$. This may ease installation of the optical cable, especially if the cable needs to be cut or shortened to match it with the connectors or to fit it into an installation pathway. In that case, the installer would not need to know where the twisted portion is positioned along the cable length. Furthermore, this embodiment may guarantee that the optical cable is actually single-mode for its whole length $L_{TOT}$ (when L is greater than $L_{min}$). It is to be understood that approximate equality between the twisted length of the fibers and the total length of the optical cable means that the fibers are twisted along most of the total length of the cable, with the exception of a few percent of the length, usually at the terminal portions of the cable, where the fibers can be untwisted for a distance necessary for connectorizing or splicing the fibers (e.g., 2-4 cm at each cable end). The measured cut-off wavelength in the optical cable of length $L_{TOT}$ is equal to or lower than 1260 nm.

According to another embodiment, the twisted length may extend only along a portion of the total length of the optical cable. Only to provide a non-limitative numerical example: an optical cable of $L_{TOT}$=10 m comprises at least one optical fiber, which is helically twisted along an initial portion of the cable with a twisting pitch of 25 mm and a twisted length, L<$L_{TOT}$, of from 2 to 5 m. The twisted length has an input twisted end receiving the optical signals end an output twisted end. In a preferred embodiment, either the input twisted end or the output twisted end may correspond to the cable input end or to the cable output end, respectively. However, both the input twisted end and the output twisted end may also be located in an intermediate position along the cable, according to specific cable design requirements. At the output of the twisted portion of the optical fiber, i.e., at the output twisted end, transmission is single-mode, as the twisting has faded away the $LP_{11}$ optical mode. Preferably, the twisted portion is provided so that the output twisted end approximately corresponds to the output end of the optical cable. Under these conditions, the measured cut-off wavelength of the optical cable, i.e., at the cable output end, results to be equal to or smaller than 1260 nm. It is noted that, while it is contemplated to leave non-twisted portions in the cable, e.g., when external disturbances can be excluded, it is preferred to apply twisting in a cable portion as long as possible with respect to the total cable length.

Figure 6:
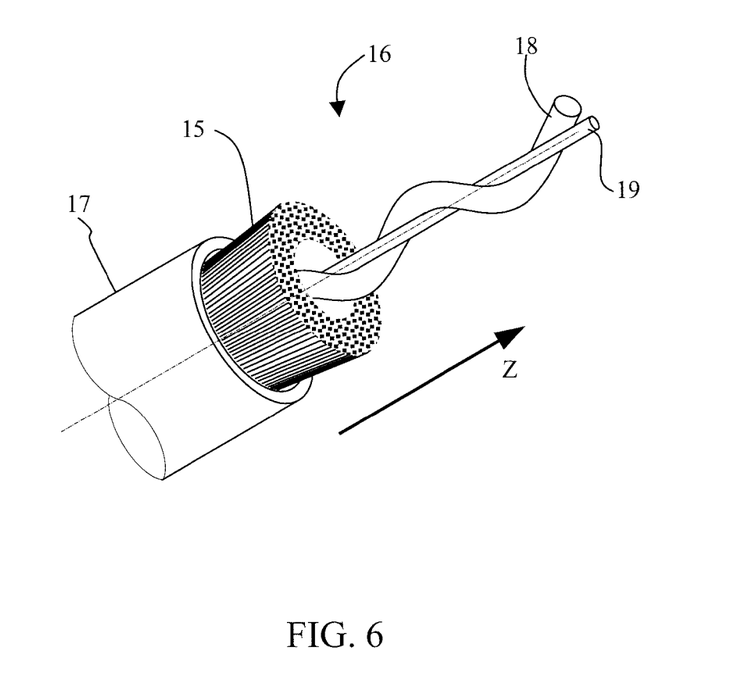
FIG. 6 is a schematic perspective view of an optical cable according to another embodiment of the present invention.

According to an embodiment of the present invention, the bend-insensitive optical cable comprises one optical fiber only. FIG. 6 is a schematic representation of an optical cable 16 comprising an optical fiber 18, which is helically wound around a central element 19 that extends along a longitudinal direction Z, substantially corresponding to the axis about which the optical fiber is wound, i.e., the helical axis. The optical fiber 18 is a single-mode optical fiber having an effective cut-off wavelength equal to or higher than 1290 nm, preferably up to 1650 nm, and more preferably of from 1320 to 1650 nm.

In an embodiment, the optical fiber 18 is "tight buffered", namely it comprises an optical fiber, made e.g., of silica glass, surrounded by a coating system, which is in turn surrounded by a buffer layer. The outside diameter of the optical fiber can range for example from 600 to 1000 μm. The central element 19 can be for instance a rod of GRP (Glass Reinforced Polymer) of outer diameter of 1 μm.

It is to be understood that equations (2) and (3) hold also for the twisting of the optical fiber illustrated in FIG. 6.

The optical cable 16 including the twisted optical fiber 18 has a loose-tube buffer construction comprising strengthening members, such as water-absorbing filaments, 15 applied over the twisted optical fiber and a polymer tubular jacket 17. It is to be understood that the presence of strengthening members 15 in the optical cable is optional.

The embodiment of FIG. 6 can be advantageous if a reduced cross-sectional dimension of the cable is required, e.g., of less than a few mm of diameter. In such a case, the central element 19 can be of a relatively small diameter, e.g., of 0.5 mm.

Figure 7:
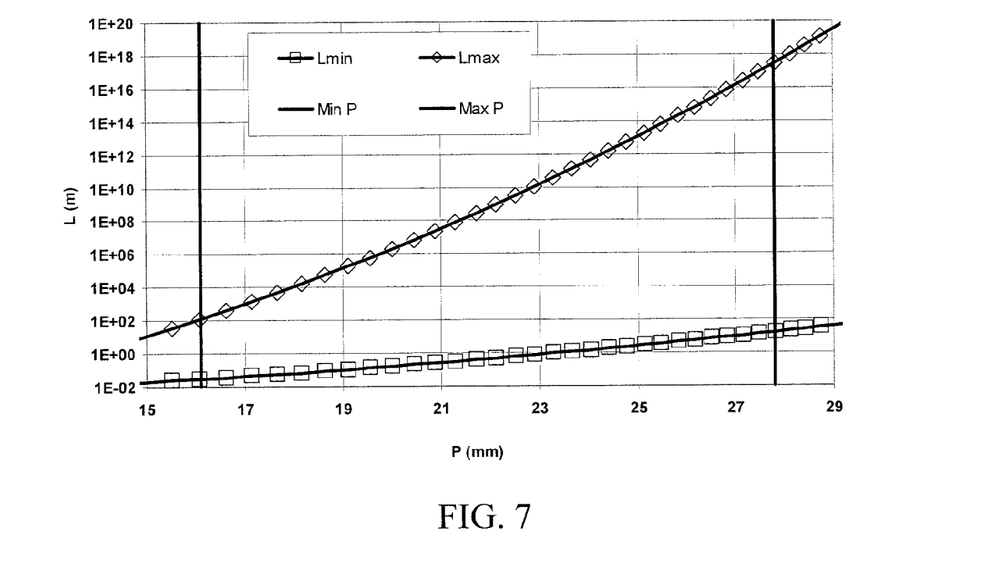
FIG. 7 is a plot of the twisted length, L, (in meters) as a function of twisted pitch, P (in mm) for an optical fiber having $(\lambda_{cc})_A$ of 1320 nm and MFD of 8.66 μm. Square and diamond symbols represent the minimum length ($L_{min}$) and the maximum length ($L_{max}$), respectively, of the twisted portion, which satisfy some conditions described hereafter with reference to the figure.

FIG. 7 is a plot of the length, L, (in ordinate, meters) of the portion of the optical cable along which at least an optical fiber is twisted about an helical axis, i.e., the twisted length, as a function, in abscissa, of twisting pitch, P (in mm). The at least one optical fiber has $(\lambda_{cc})_A$=1320 nm and MFD=8.66 μm. Square and diamond symbols represent the minimum length ($L_{min}$) and the maximum length ($L_{max}$), respectively, of the twisted length, L, for a given twisting pitch for which the conditions described herebelow hold. The plot shows an approximately logarithmic-linear relationship between twisted length and twisting pitch (solid lines through data). By interpolating the data of FIG. 7, it is possible to infer an empirical mathematical relationship, generally of the type:

$$\log_{10}(L_{min})=a_1+b_1 \cdot P+c_1 \cdot P^2$$

$$\log_{10}(L_{max})=a_2+b_2 \cdot P+c_2 \cdot P^2 \quad (4)$$

where, for the example of FIG. 7, $a_1$=−6.72, $b_1$=0.57 and $c_1$=0, and $a_2$=−14.6 and $b_2$=1.37 and $c_2$=0.

In FIG. 7, the graphic area enclosed by the vertical thick solid lines and the lines through the values of $L_{min}$ and $L_{max}$ represent the range of values of P and L for which the following conditions are met:
  (a) for a given twisting pitch, P, or equivalently for a given radius of curvature, the twisted length of the cable is long enough to make the higher-order modes (thus, $L_{P11}$) vanish, i.e., $(\lambda_{cc})_B$ is not more than 1260 nm, as measured according to the cabled configuration in IEC 60793-1-44 method B;
  (b) the minimum cable length compatible with single-mode transmission is less than 20 m, where the length of 20 m corresponds to the uncoiled portion of the test length according to method B;
  (c) the twisted length is such that the total attenuation of the fundamental mode ($L_{P01}$) along the optical cable caused by the twisting of the fiber(s) is less than 0.1 dB at a wavelength of 1550 nm, and
  (d) the value of P is such that the attenuation coefficient (i.e., attenuation per unit length) of the fundamental mode ($L_{P01}$) along the twisted length caused by the twisting of the fiber(s) is less than 1 dB/km at a wavelength of 1550 nm.

In general, condition (a) influences especially the value of $L_{min}(P)$, condition (b) the maximum value of P, condition (c) the value of $L_{max}(P)$, and condition (d) affects in particular the minimum value of P. For the example of FIG. 7, the range of P values meeting the above conditions is of from 17 mm to 28 mm, and is preferably selected of from 20 mm to 28 mm.

From results in FIG. 7 it can be observed that the upper limit of twisted length $L_{max}$ is not a concern in most access distribution network and PON applications, due to the fact that the total length of cables employed in access networks generally does not exceed a length of 1-2 km. For instance, for P=17 mm, $L_{max}$ is of 1.3 km, while for P=28 mm $L_{max}$ takes a very large value.

Figure 8:
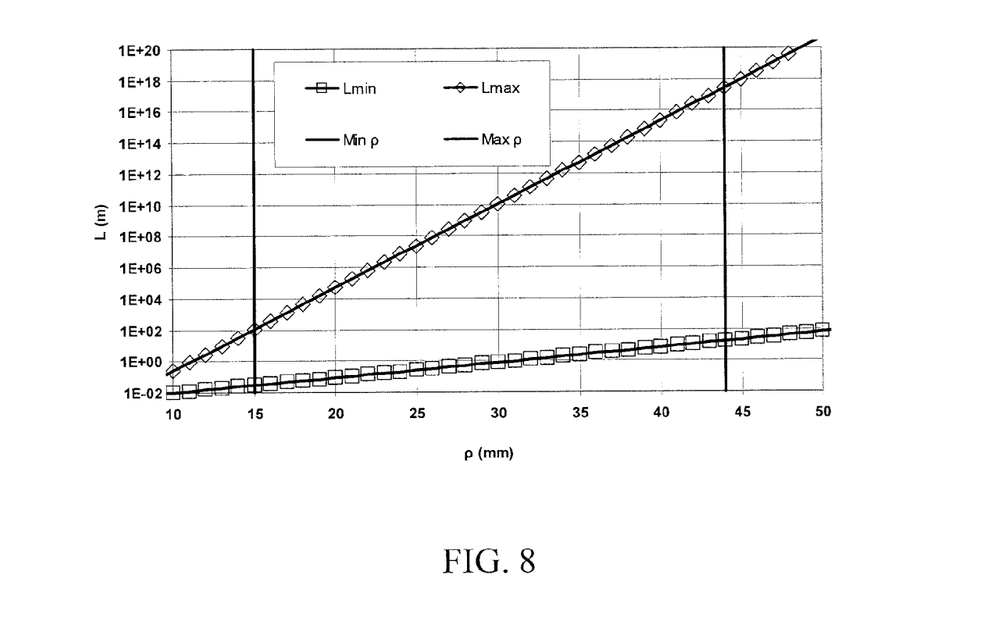
FIG. 8 is a plot corresponding to the plot of FIG. 7, where L is represented as a function of the radius of curvature ρ (in mm) associated to the twisted pitch, P.

FIG. 8 is a plot corresponding to the plot of FIG. 7, where L is represented as a function of the radius of curvature ρ (in mm) associated to the twisted pitch, P, according to Eq. (2) for an outside diameter of the twisted fiber, 2R, of 900 μm, e.g., the fiber is a standard tight-buffered fiber.

It is to be understood that conditions (b) to (d) are to a certain extent arbitrarily selected and they should not be construed as limitative of the present invention. More generally, conditions (b) to (d) only reflect typical desired properties in applications for single-mode signal transmission.

The values of L and P (or ρ) reported in FIG. 7 (or FIG. 8) and in Eq. (4), in the following graphics (FIGS. 8-10) and numerical examples herein reported are customarily calculated by the skilled person in the art by using mathematical equations, per se known, for transmission of optical modes along an optical fiber and by taking into account the values of the cut-off wavelength, $(\lambda_{cc})_A$, and MFD of the twisted fiber or fibers. Within the teaching of the present invention, from the examples and ranges given herein, suitable values of P and L (or $L_{min}$ and $L_{max}$) can be readily determined by the skilled person for a given value of $(\lambda_{cc})_A$ selected in the range 1290-1650 nm and for a selected value of MFD, which is preferably comprised between 8.6 and 9.5 μm. Preferably, $(\lambda_{cc})_A$ is selected in the range 1320-1650 nm, more preferably in the range 1450-1650 nm.

Figure 9:
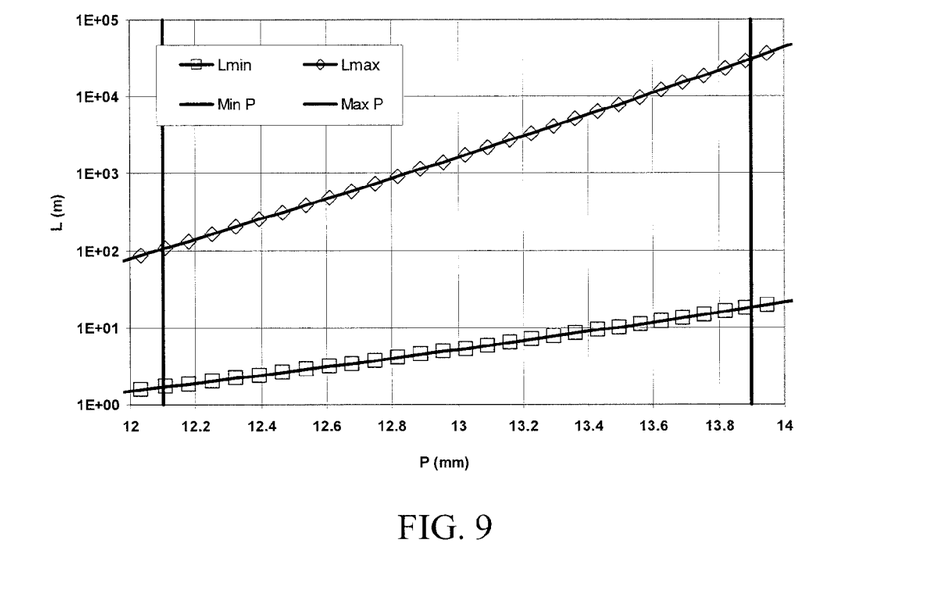
FIG. 9 is a plot of the twisted length, L, (in meters) as a function of twisted pitch, P (in mm) for an optical fiber having $(\lambda_{cc})_A$ of 1644 nm and MFD of 8.60 μm. Square and diamond symbols represent the minimum length ($L_{min}$) and the maximum length ($L_{max}$), respectively, of the twisted portion, which satisfy some conditions described hereafter with reference to the figure.

FIG. 9 is a plot of the twisted length, L, (in meters) as a function, in abscissa, of twisting pitch, P (in mm) of an optical cable comprising at least one optical fiber with $(\lambda_{cc})_A$=1644 nm and MFD=8.60 μm. Square and diamond symbols represent the minimum length ($L_{min}$) and the maximum length ($L_{max}$), respectively, of the twisted length, L, for a given twisting pitch. The graphic area delimited between the vertical thick solid lines and between lines through $L_{min}$ and $L_{max}$ data represents the range of values of P and L for which the above-described conditions (a) to (d) are met.

Interpolation of data of FIG. 9 using Eq. (4) provides the following parameters: $a_1$=−2.70, $b_1$=−0.02, $c_1$=0.006, $a_2$=−5.87 and $b_2$=0.02 and $c_2$=0.03.

It is to be understood that, for different values of MFD and/or $(\lambda_{cc})_A$, calculated values of $L_{min}(P)$ and $L_{max}(P)$ data can be interpolated by a polynomial function different from that given in Eq. (4) and thus Eq. (4) should not be construed as limiting the present invention.

The range of P values of FIG. 9 meeting the above-described conditions (a) to (d) is of from 12 mm to 14 mm.

Figure 10:
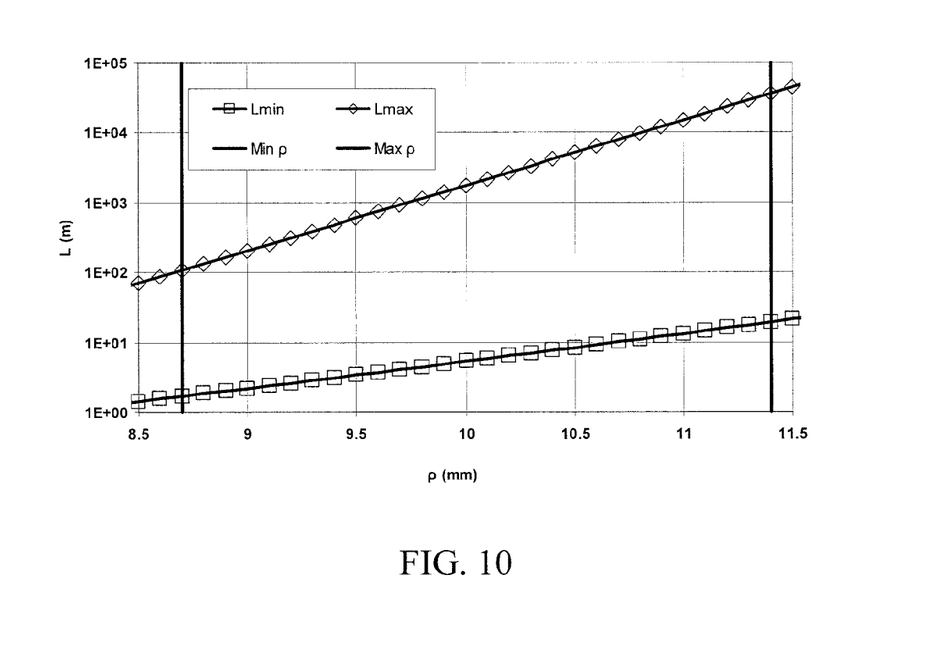
FIG. 10 is a plot corresponding to the plot of FIG. 9, where L is represented as a function of the radius of curvature ρ (in mm) associated to the twisted pitch, P.

FIG. 10 is a plot corresponding to the plot of FIG. 9, where L is represented as a function of the radius of curvature ρ (in mm) associated to the twisted pitch, P, according to Eq. (2) for an outside diameter of the twisted fiber, 2R, of 900 μm, e.g., the fiber is a standard tight-buffered fiber.

According to some preferred embodiments, the twisted pitch, P, is selected in the range from 10 to 30 mm, wherein a suitable value will be selected within that range by taking into account the values of $(\lambda_{cc})_A$ and of MFD of the at least one optical fiber comprised in the cable.

Figure 11:
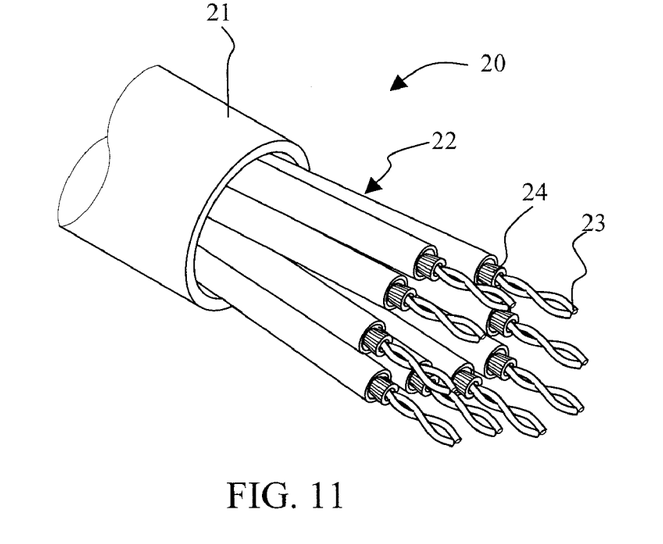
FIG. 11 is a schematic perspective view of a distribution optical cable according to an embodiment of the present invention.

FIG. 11 is a schematic perspective view of a distribution optical cable according to an embodiment of the present invention. The distribution cable 20, which can be used for instance for intra-building, risers, and plenum applications, comprises a bundle 22 of drop cables, wherein at least one optical cable of the bundle, and preferably each of the plurality of drop cables, comprises at least one twisted optical fiber 23 with cut-off wavelength of at least 1290 nm, preferably up to 1650 nm. Each drop cable can be split from the distribution cable and then branched directly to individual subscribers. Accordingly, an access distribution network presenting low macrobending losses and single-mode transmission from the MDU or the central office down to the user's terminals can be obtained.

In a preferred embodiment (illustrated in the figure), the drop cables of bundle 22 are of the type illustrated in FIG. 4 and comprise a twisted pair of optical fibers 23, optionally surrounded by strengthening members 24. The bundle 22 of drop cables is enclosed by a tubular outer sheath 21, made for instance by a flame-retardant thermoplastic material, such as an LSOH material. Although not shown in FIG. 11, at least one reinforcing element can be embedded into the sheath and disposed along the length of the cable, so as to reduce mechanical stresses on the optical fibers due to tensile forces. Usually the reinforcing element can be made from a glass reinforced polymer (GRP) rod or can be an aramid rod.

Figure 12:
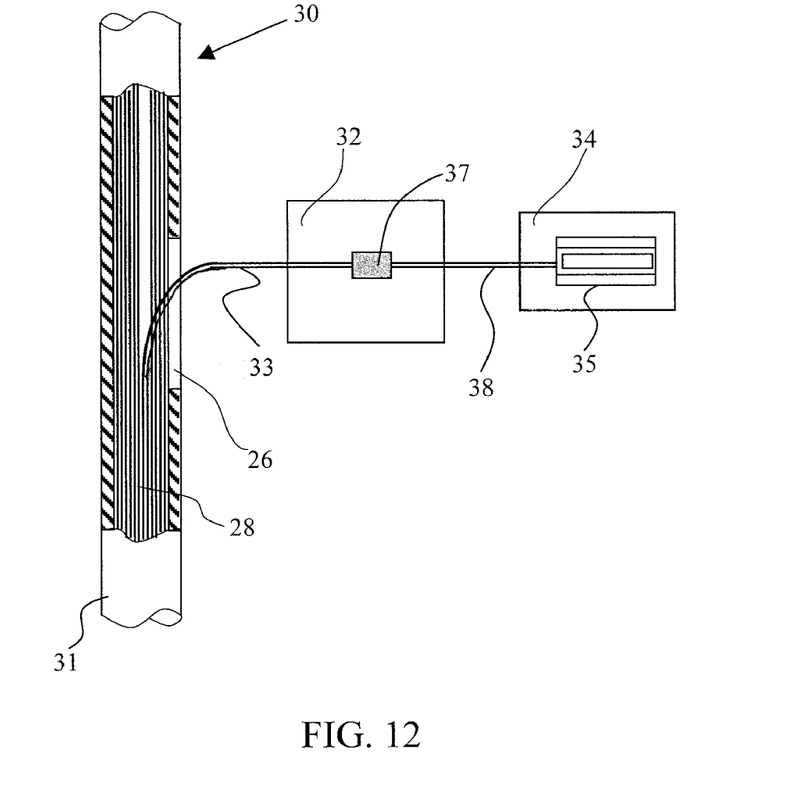
FIG. 12 is a schematic diagram of an access connection between a distribution optical cable to an individual subscriber, according to an embodiment of the present invention.

FIG. 12 illustrates an access connection from a distribution cable to an individual subscriber, which can represent a portion of an access distribution network, according to an embodiment of the present invention. A distribution cable 30 comprises a bundle 28 of tight-buffered distribution optical fibers, which are enclosed in an outer sheath 31. The distribution cable can be a riser cable of commercial type, such as a VertiCasa™ Riser Cable commercialized by Prysmian Cable & Systems and comprising up to 96 buffered CasaLight™ single-mode optical fibers, VertiCasa™ and CasaLight™ being trademarks by Prysmian Cable & Systems. In order to make a connection, a window 26 is cut in the cable sheath 31. One distribution optical fiber 33 of the bundle 28 is cut at a certain distance downstream the window 26, e.g., at an upper floor of the building (typically up to 20 m from the window 26) and is pulled down out of the distribution cable 30 to be positioned inside an intermediate transition box (ITB) 32. The ITB 32 comprises a splicing tray 37, in which one fiber (not shown) of a drop cable 38 is joined to the distribution fiber 33 of the distribution cable. The distribution fiber extracted from the distribution cable can run from the distribution cable to the ITB inside a pre-installed protection tube (not shown). Optical fiber of the drop cable and optical fiber 33 are first spliced, e.g., by stripping off the buffer at a terminating portion of each fiber for a short length suitable for the mechanical or fusion splicing. Alternatively, optical fiber of the drop cable can be connectorized, i.e., an optical connector (the so-called pigtail) is mounted on one cable end. Drop cable 38 is pulled till the subscriber's access termination box (ATB) 34, which comprises an optical pigtail box 35 including an optical/electrical converter. The drop cable 38 can be of the type shown with reference to FIG. 6 and comprises one twisted optical fiber with effective cut-off wavelength of at least 1290 nm and preferably of from 1290 nm to 1650 nm. The optical fiber is twisted around a longitudinal direction along most of the drop cable length. The end portions of the fiber (e.g., each end portion being few cm long) are preferably left untwisted for joining the drop cable fiber to the distribution fiber on one end and for pigtailing the drop cable fiber on the other end of the drop cable or for connectorizing the fiber on either end.

In a preferred embodiment, two distribution optical fibers (the second fiber is not shown in FIG. 12) of bundle 28 are drawn from the window 26 of the distribution cable 30. The two distribution fibers are routed to the ITB 32, in which they are cut and spliced to be respectively joined to two fibers of a drop cable 38 within the splicing box 37. The distribution fibers extracted from the distribution cable can run inside a pre-installed protection tube. In this embodiment, the drop cable 38 is a cable of the type shown with reference to FIG. 4, the cable comprising two optical fibers twisted together, wherein each of the optical fibers has an effective cut-off wavelength of at least 1290 nm and preferably of from 1290 nm to 1650 nm. The optical fibers are twisted together along most of the drop cable length. The end portions of the fibers (e.g., each end portion being few cm long) are preferably left untwisted for joining to the distribution fibers on one end and for pigtailing on the other end of the drop cable or for connectorizing the fibers on either end.

It is to be understood that the splicing tray 37 can be an integrated splicing tray housing a plurality of fibers drawn from the distribution cable 30 so that they can be joined to a plurality of drop cables in the ITB 32.

The foregoing is a description of various embodiments of the invention, but it is to be understood that other embodiments and examples may perform similar functions and/or achieve similar results. All such equivalent embodiments are within the scope of the present invention and intended to be covered by the appended claims.

In particular, although optical cables including at least one twisted optical fiber have been described with reference to an optical cable comprising one twisted optical fiber or a pair of twisted optical fibers, the present invention envisages an optical cable comprising more than two optical fibers twisted around each other, for instance three optical fibers twisted in a three-threaded plait.

The invention claimed is:

1. An optical cable for transmitting optical signals, the optical cable having a length extending from an input end capable of being adapted to receive the optical signals, to an output end, comprising:
    at least one single-mode optical fiber having a cable cut-off wavelength of 1290 nm to 1650 nm and a mode-field diameter, wherein said at least one optical fiber is helically twisted around a longitudinal axis with a twisting pitch for a twisted length extending along at least a portion of the length of the optical cable, and wherein the twisted length and the twisting pitch are selected such that the optical cable exhibits a measured cut-off wavelength equal to or lower than 1260 nm.

2. The optical cable of claim 1, wherein the cable cut-off wavelength of the at least one optical fiber is 1320 nm to 1650 nm.

3. The optical cable of claim 1, wherein the twisting pitch is 10 to 30 mm.

4. The optical cable of claim 1, wherein the twisted length is selected in dependence of a value of the twisting pitch which is selected in dependence of the cable cut-off wavelength and the mode-field diameter value of the optical fiber.

5. The optical cable of claim 1, wherein the twisted length is at least 2 meters.

6. The optical cable of claim 1, wherein the twisted length is not greater than 2 km.

7. The optical cable of claim 1, wherein the twisted length is approximately equal to the length of the optical cable.

8. The optical cable of claim 1, wherein the at least one optical fiber comprises two optical fibers twisted together along the longitudinal axis, each of the two optical fibers having a cable cut-off wavelength of 1290 nm to 1650 nm.

9. The optical cable of claim 1, wherein the at least one optical fiber comprises an optical fiber twisted around a central element extending along the longitudinal axis.

10. The optical cable of claim 1, wherein the optical cable has a loose-tube construction and comprises a longitudinally extending outer jacket enclosing the at least one optical fiber.

11. The optical cable of claim 10, further comprising strengthening members enclosed in the outer jacket and longitudinally positioned around the at least one optical fiber.

12. The optical cable of claim 10, wherein the at least one optical fiber is a tight-buffered fiber.

13. The optical cable of claim 12, wherein the at least one optical fiber has an outer diameter of 600 µm to 1000 µm.

14. The optical cable of claim 1, wherein the at least one optical fiber is of match-clad type.

15. The optical cable of claim 1, wherein the at least one optical fiber has a mode-field diameter value of at least 8.6 µm.

16. The optical cable of claim 1, wherein the at least one optical fiber has a mode-field diameter value of 8.6 µm to 9.0 µm.

17. A distribution optical cable comprising a bundle of optical drop cables and a longitudinally extending outer sheath enclosing the bundle of optical drop cables, wherein at least one of the optical drop cables of the bundle is an optical cable according to claim 1.

18. A distribution optical cable comprising a bundle of optical drop cables and a longitudinally extending outer sheath enclosing the bundle of optical drop cables, wherein at least one of the optical drop cables of the bundle, and wherein each of the optical cables of the bundle, is an optical cable according to claim 1.

19. An access distribution network comprising:
a distribution optical cable comprising a bundle of distribution optical fibers, wherein at least one of the distribution optical fibers of the bundle is extracted from the distribution optical cable and routed away therefrom to a fiber splicing area,
wherein the fiber splicing area comprises a splicing tray for joining a downstream portion of the at least one distribution optical fiber of the distribution cable and an upstream portion of at least one optical fiber of an optical drop cable, and
the optical drop cable is an optical cable according to claim 1.

* * * * *